United States Patent

Oda

[11] Patent Number: 6,062,876
[45] Date of Patent: May 16, 2000

[54] ELECTRICAL CONNECTION BOX FOR AN AUTOMOTIVE VEHICLE

[75] Inventor: Akihiro Oda, Yokkaichi, Japan

[73] Assignee: Sumitomo Wiring Systems, Ltd., Japan

[21] Appl. No.: 09/111,424

[22] Filed: Jul. 7, 1998

[30] Foreign Application Priority Data

Jul. 7, 1997 [JP] Japan .................................... 9-181555

[51] Int. Cl.[7] .................................................. H01R 9/09
[52] U.S. Cl. ............................................................ 439/76.2
[58] Field of Search ................................ 439/76.2, 76.1, 439/949; 361/626, 630, 395

[56] References Cited

U.S. PATENT DOCUMENTS

| | | |
|---|---|---|
| 4,688,149 | 8/1987 | Inoue et al. . |
| 4,940,419 | 7/1990 | Kurita et al. ............................ 439/76.2 |
| 5,040,097 | 8/1991 | Stribel .................................... 439/76.2 |
| 5,249,973 | 10/1993 | Fujita et al. ............................. 439/76.2 |
| 5,478,244 | 12/1995 | Maue et al. ............................. 439/76.2 |
| 5,699,233 | 12/1997 | Zlamal .................................... 439/76.2 |
| 5,771,151 | 6/1998 | Hotea et al. ............................. 439/76.2 |

*Primary Examiner*—Steven L. Stephan
*Assistant Examiner*—J. F. Duverne
*Attorney, Agent, or Firm*—Anthony J. Casella; Gerald E. Hespos

[57] ABSTRACT

An electrical connection box for an automotive vehicle is provided which reduces costs for parts by allowing only printed circuit boards with necessary electronic control circuits to be selectively mounted. The electrical connection box has a plurality of partition members 3 integrally and projectingly formed on a side surface of a casing 1, i.e. an inner surface of an accommodation space 2 at specified intervals. The respective partition members 3 extend from the upper surface to the lower surface of the casing 1 and the leading ends thereof project sideways. Printed circuit boards 4*a*, 4*b*, 4*c* are inserted into spaces between neighboring partition members 4*a*, 4*b*, 4*c*. On each of the printed circuit boards 4*a*, 4*b*, 4*c* are mounted a variety of electronic devices such as a relay, a diode and a capacitor constituting an electronic control circuit. In such an electrical connection box, only the printed circuit boards 4*a*, 4*b*, 4*c* having the necessary electronic control circuits mounted according to a vehicle type can be selectively accommodated in the accommodation space 2. Therefore, there are no unused electronic control circuits and, a cost for parts can be reduced.

5 Claims, 2 Drawing Sheets

ELECTRICAL CONNECTION BOX FOR AN AUTOMOTIVE VEHICLE

BACKGROUND OF THE INVENTION

1. Field of the Invention

The present invention relates to an electrical connection box for an automotive vehicle. The connection box is designed to enable only printed circuit boards having necessary electronic control circuits for a particular vehicle type to be selectively mountable in the connection box to reduce a cost for parts.

2. Description of the Prior Art

In recent years, electronics have been applied increasingly to vehicles to accommodate electric devices having a variety of functions. Electronic control circuits for controlling these electric devices are collectively installed in an electrical connection box comprised of a single junction box.

As shown in FIGS. 3A and 3B, a prior art electronic control unit accommodating portion 53 is provided at one side of a casing 50 of a prior art electrical connection box, and one printed circuit board 52 is accommodated in the accommodating portion 53 along an inner surface of its side wall. A variety of electronic parts such as relays, diodes, capacitors constructing electronic control circuits for controlling the electric devices are mounted on the printed circuit board 52. The printed circuit board 52 is connected electrically with a terminal 51b provided in a connector receptacle 51a formed in a cover 51 of the prior art accommodating portion 53. For example, a prior art connector is provided at the leading end of a wiring harness that is connected with the respective electric devices such as an intermittent windshield wiper, a key alarm and a shift lock. This prior art connector is fitted into the connector receptacle 51a for the connection.

Automotive vehicles are equipped with different electric devices depending on their types, and optional electric devices may be equipped according to a car owner's wish. The prior art printed circuit board 52 in the casing 50 of the prior art electrical connection box is provided with electronic control circuits for controlling all electric devices for all types of vehicles. Electronic control circuits for electric devices that are not provided on a particular vehicle are rendered unusable. Thus, the printed circuit board 52 can conform to the vehicle type and meet the car owner's wish.

The above described prior art electrical connection box includes electronic control circuits which are not used at all on certain vehicle types. This results in an increased cost for parts.

In view of the above problem, an object of the present invention is to provide an electrical connection box for an automotive vehicle which has a reduced cost for parts.

SUMMARY OF THE INVENTION

According to the invention, there is provided an electrical connection box for an automotive vehicle comprising a junction box which is connected or connectable with an automotive wiring harness and which is provided with one or more electronic and/or electric control circuits. An accommodation space for the electronic control circuits is provided on a casing of the electrical connection box, and printed circuit boards having necessary electronic and/or electric control circuits, according to a vehicle type, are inserted or insertable individually into the accommodation space via one or more partition members.

Accordingly, there is provided an electrical connection box for an automotive vehicle which has a reduced cost for parts by allowing only printed circuit boards with necessary electronic control circuits to be selectively mounted.

Preferably, an electrical connection box for an automotive vehicle is provided with a junction box connected with an automotive wiring harness, and is provided internally with electronic control circuits. An accommodation space of the electronic control circuits is provided at one side of a casing of the electrical connection box, and printed circuit boards having necessary electronic control circuits mounted according to a vehicle type are inserted individually into the accommodation space via partition members.

With the above construction, the printed circuit boards having the electronic control circuits mounted thereon can be inserted individually into the casing of the electrical connection box via the partition members. Accordingly, only the printed circuit boards having the necessary electronic control circuits thereon according to the vehicle type can be installed in the casing of the electrical connection box, thereby eliminating the unused electronic control circuits from the construction, unlike the prior art.

One or more partition members may be formed integrally or unitarily and projectingly on a corresponding surface of the accommodation space. Additionally or alternatively one or more partition members may be provided separately from the casing of the electrical connection box. Preferably partition member fitting grooves are formed in a corresponding surface of the accommodation space at specified intervals and/or the size of an accommodating portion for each printed circuit board having the electronic control circuit thereon is made adjustable by selectively mounting the separate partition members in corresponding partition member fitting grooves.

The partition members may be integrally and projectingly formed on an inner surface of the accommodation space, and/or may be provided separately from the casing of the electrical connection box.

In the case that the partition members are provided separately from the casing of the electrical connection box, partition member fitting grooves may be formed in the inner surface of the accommodation space at specified intervals and the size of an accommodating portion for each printed circuit board having the electronic control circuit thereon is made adjustable by selectively mounting the separate partition members in the partition member fitting grooves. Therefore, the printed circuit boards of the sizes according to the scales of the electronic control circuits can be accommodated.

A cover provided with one or more connector receptacles for the connection with the printed circuit boards may be connected or connectable in advance with the printed circuit boards having the respective electronic control circuits mounted thereon, so that an opening to the accommodation space preferably can be closed substantially by the cover.

A cover provided with connector receptacles for the connection with the printed circuit boards may be connected in advance with the printed circuit boards having the respective electronic control circuits mounted thereon, so that an opening of the accommodation space can be closed by the cover.

With this construction, the printed circuit boards can be accommodated in the casing of the electrical connection box and the opening of the accommodation space can be closed by the cover formed with the connector receptacles. This leads to an improved assembling operability.

Partition members having leading ends of different lengths may be arranged so that the one or more printed circuit boards may be arranged on different planes. Accordingly a more compact arrangement of the printed circuit boards may be achieved thus improving the space utilization. Printed circuit boards having different lengths may be used and arranged, in particular, by overlapping a portion thereof with a portion of the adjacent printed circuit board and arranging them on planes that may be substantially parallel to each other.

These and other objects, features and advantages of the present invention will become more apparent upon a reading of the following detailed description and accompanying drawings.

DETAILED DESCRIPTION OF THE PREFERRED EMBODIMENTS

An electrical connection box for an automotive vehicle which is comprised of a junction box is connected with electric and/or electronic devices such as an intermittent windshield wiper, a key alarm and a shift lock, a board computer via a wiring harness. The electrical connection box preferably is provided internally with electronic control circuits for controlling the electric and/or electronic devices.

Figure 1B:
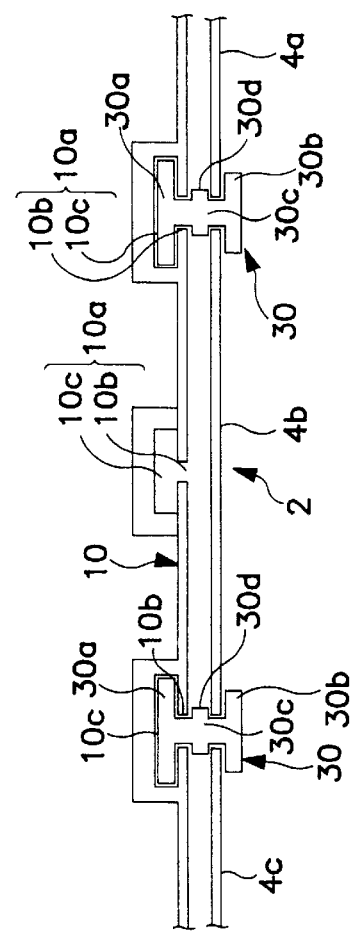
FIG. 1(A) is a plan view of a first embodiment of the invention and FIG. 1(B) is a section along A—A of FIG. 1(A).
Figure 1A:
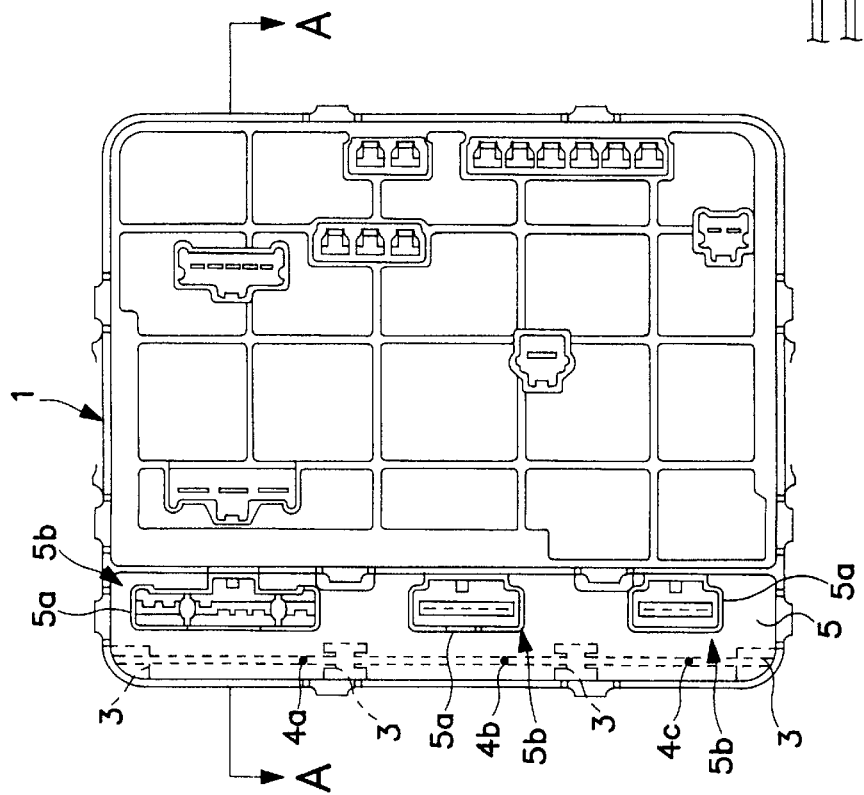
Figure 3B:
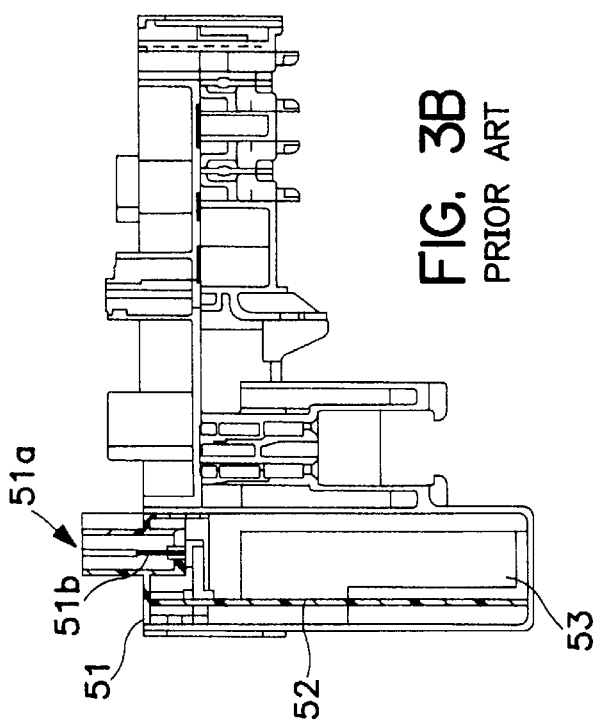
FIG. 3(A) is a plan view of a prior art electrical connection box and FIG. 3(B) is a section along A—A of FIG. 3(A).
Figure 3A:
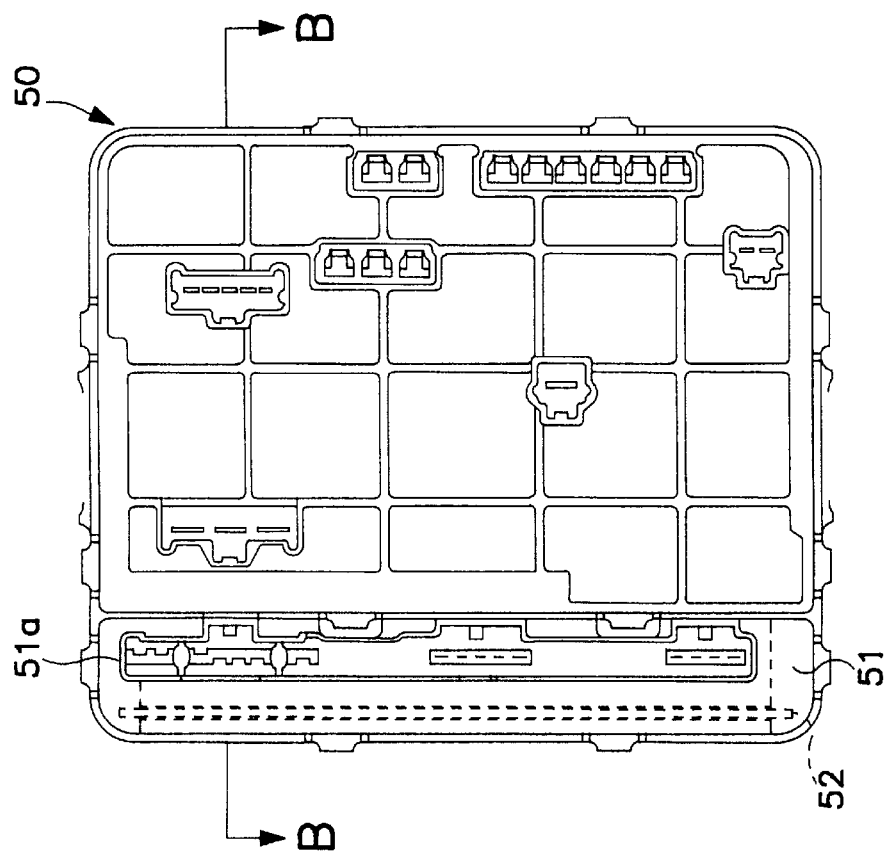

As shown in FIG. 1, an accommodation space 2 for electronic control circuits (not shown) is provided at one side of a casing 1 of the electrical connection box.

A plurality of partition members 3 are formed integrally or unitarily and projectingly on an inner side surface of the accommodation space 2 of the casing at specified intervals. The respective partition members 3 extend from the upper surface to the lower surface of the casing 1, and the leading ends thereof project at an angle different from 0° or 180°, and preferably substantially sideways or parallel to the inner side surface of the accommodation space 2.

One or more printed circuit boards 4a, 4b, 4c are inserted into spaces between neighboring partition members 3. A variety of electronic and/or electric parts, such as a relay, a diode and a capacitor constituting an electronic and/or electric control circuit, are mounted or are mountable on each of the printed circuit boards 4a, 4b, 4c.

For example, an electronic control circuit for the shift lock is mounted on the printed circuit board 4a; an electronic control circuit for the key alarm is mounted on the printed circuit board 4b; and an electronic control circuit for the intermittent windshield wiper is mounted on the printed circuit board 4c.

Spacings between neighboring partition members 3 are substantially equal to the widths of the respective printed circuit board 4a, 4b, 4c to be mounted or inserted or arranged therebetween.

The upper surface of the casing 1, i.e. the opening of the accommodation space 2 is closed by a cover 5. The cover 5 is provided with connector receptacles 5a for connection with the printed circuit boards to provide connector spaces 5b. Terminals 5c in the connector spaces 5b are electrically connected or connectable with the respective printed circuit boards 4a, 4b, 4c. Connectors (not shown) are or can be accommodated in the connector spaces 5b. The connectors are provided at the leading ends of wiring harnesses having their other ends connected or connectable with the respective electric devices.

In the electrical connection box as above, only the printed circuit boards 4a, 4b, 4c having the necessary electronic control circuits according to the vehicle type can be accommodated selectively in the accommodation space 2. Thus, there are no unused electronic control circuits as in the prior art and, therefore, a cost for parts can be reduced.

Although the partition members 3 integrally project from the casing 1 in the first embodiment, they may be provided separately from the casing 1.

Figure 2:
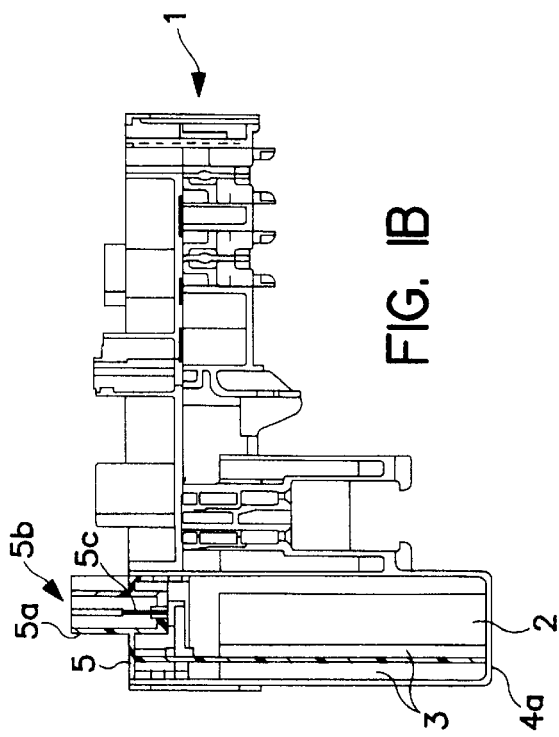
FIG. 2 is a schematic diagram of an essential portion of a second embodiment of the invention.

In this case, as shown in a second embodiment of FIG. 2, a plurality of partition member fitting grooves 10a are formed preferably in an inner surface of the accommodation space 2, i.e. a side surface of a casing 10 at specified (predetermined or predeterminable) intervals. Each partition member fitting groove 10a is comprised of a slit 10b which is formed in the inner surface of the casing 10 to extend from the upper surface to the lower surface. A partition member accommodating portion 10c which is preferably substantially continuous with the slit 10b projects preferably toward the outside of the casing 10.

Partition members 30 are each formed with a mount portion 30a to be mountable on the casing 10 at one end and a fixing portion 30b to be connectable with the corresponding one of the printed circuit boards 4a, 4b, 4c. The mount portions 30a and the fixing portion 30b both have leading ends that project substantially sideways, i.e. at an angle different form 0° or 180° with respect to a main body 30c thereof, and preferably extend substantially from the upper surface of the casing 10 toward substantially the lower surface thereof.

The partition member 30 may be provided with additional fixing portions 30d projecting preferably from the main body 30c for holding or positioning the printed circuit boards 4a, 4b, 4c, preferably at a distance from the casing 10. The main bodies may be formed with different longitudinal lengths (not shown) so as to allow the arrangement of the printed circuit boards 4a, 4b, 4c on a plurality of different planes that preferably are substantially parallel to each other.

By selecting the partition member fitting groove 10a and mounting the separate partition member 30, the sizes of the accommodating portions for the printed circuit boards 4a, 4b, 4c can be adjusted by adjusting spacings between neighboring partition members 30. Accordingly, the printed circuit boards 4a, 4b, 4c having different sizes depending on the scales of the electronic control circuits can be accommodated.

The printed circuit boards 4a, 4b, 4c mounted separately in the casings 1, 10 in the first and second embodiments. However, assembling operability can be improved by connecting a cover formed with connector receptacles for the connection with the printed circuit boards in advance by an L-shaped fixing device, inserting the printed circuit boards 4a, 4b, 4c into the spaces between neighboring partition members 3, in the accommodation space 2, and mounting the cover 5 on the upper surface of the casing 1 or 10. The same effect as above can be obtained even if a cover is integrally formed with the printed circuits.

As is clear from the above description, the printed circuit boards having the electronic control circuits mounted thereon can be inserted individually into the casing of the electrical connection box via the one or more partition members. Thus, only the printed circuit boards having the necessary electronic control circuits mounted according the vehicle type can be installed in the casing of the electrical connection box, thereby eliminating the unused electronic control circuits from the construction unlike the prior art. This brings about a reduced cost for parts.

What is claimed is:

1. An electrical connection box for an automotive vehicle, said electrical connection box comprising a casing having a plurality of interconnected side walls defining an accommodation space between said side walls, at least one of said side walls having a plurality of partition members projecting therefrom and into said accommodation space, each of said partition members being formed with at least one groove, said grooves being substantially parallel to one another and lying in a common plane within the accommodation space, said partition members being disposed such that a plurality of pairs of facing grooves are defined in said accommodation space, said pairs of facing grooves being dimensioned and disposed for slidably receiving printed circuit boards having necessary electronic control circuits thereon according to a particular vehicle type; said electrical connection box further comprising a cover selectively mountable to said side walls for covering said accommodation space, said cover being formed with at least one connector receptacle having an inner portion for connection with the printed circuit boards and an outer portion configured for connection with an automotive wire harness.

2. An electrical connection box according to claim 1, wherein each of said partition members includes a main body projecting substantially orthogonally from said one side wall of said electrical connection box and at least one end wall projecting substantially orthogonally from said main body and substantially parallel to said one side wall of electrical connection box for defining at least a portion of said groove for receiving said printed circuit boards.

3. An electrical connection box according to claim 2, wherein at least one of said partition members comprises two of said end walls projecting in opposite respective directions from said main body.

4. An electrical connection box according to claim 3, wherein said partition members are unitarily formed with said side wall.

5. An electrical connection box according to claim 2, wherein said one side wall is formed with a plurality of substantially parallel dove-tailed grooves formed therein, said partition members being formed separately from said one side wall and having a mount portion slidably received in the respective dove-tailed grooves, each of said partition members having at least one pair of parallel end walls spaced from one another and defining one of said grooves therebetween, at least one of said partition members having two oppositely directed pairs of said end walls defining two of said grooves facing in opposite directions.

* * * * *